United States Patent [19]

Diener

[11] Patent Number: 5,046,845

[45] Date of Patent: Sep. 10, 1991

[54] TECHNOSCOPE FOR CHECKING DAMAGE TO SURFACES

[75] Inventor: Jörg Diener, Oberderdingen, Fed. Rep. of Germany

[73] Assignee: Richard Wolf GmbH, Fed. Rep. of Germany

[21] Appl. No.: 378,026

[22] Filed: Jul. 11, 1989

[30] Foreign Application Priority Data

Jul. 12, 1988 [DE] Fed. Rep. of Germany ....... 3823554

[51] Int. Cl.⁵ ............................................ G01N 21/88
[52] U.S. Cl. ..................................... 356/241; 359/435
[58] Field of Search ..................... 356/241; 350/96.26, 350/572, 573

[56] References Cited

U.S. PATENT DOCUMENTS

| 2,587,476 | 2/1952 | Huhn | 356/241 X |
| 4,267,828 | 5/1981 | Matsuo | 350/96.26 X |
| 4,403,273 | 9/1983 | Nishioka | 350/96.26 X |
| 4,702,229 | 10/1987 | Zobel | 128/4 |

FOREIGN PATENT DOCUMENTS 3512602 6/1988 Fed. Rep. of Germany .

Primary Examiner—F. L. Evans
Assistant Examiner—Matthew W. Koren
Attorney, Agent, or Firm—Hill, Van Santen, Steadman & Simpson

[57] ABSTRACT

A technoscope for checking for damage, especially a crack, in a surface of a cavity in a technical component, is arranged not only to establish the area of damage but also to measure the depth of a damaged area. To this end, the technoscope has a measuring attachment comprising a measuring probe with two electrodes for straddling the damaged area, and being supported in the cavity by a support element. The depth of the damaged area is measured by means of a depth measuring instrument sensitive to the disturbance of current flow between the electrodes, and the potential difference resulting therefrom.

9 Claims, 2 Drawing Sheets

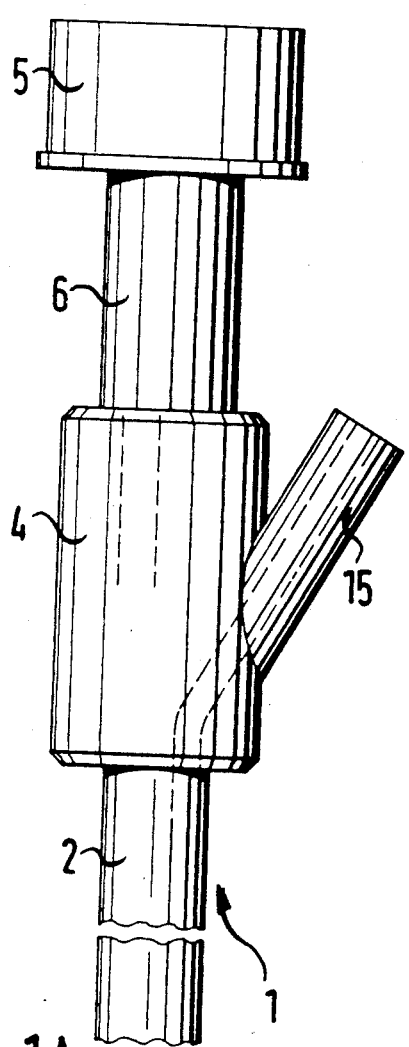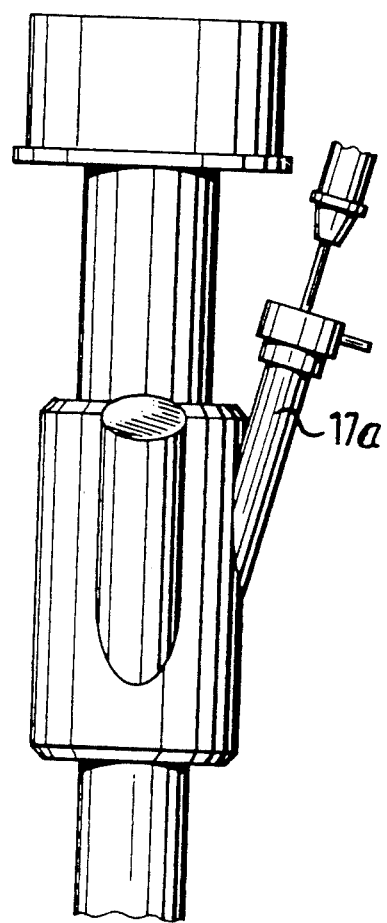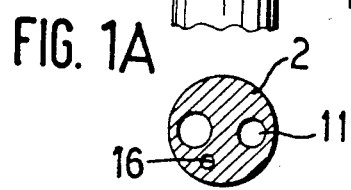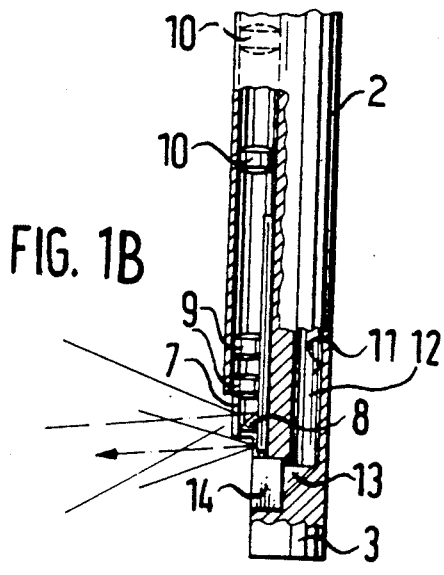

TECHNOSCOPE FOR CHECKING DAMAGE TO SURFACES

FIELD OF THE INVENTION

This invention relates to a technoscope for checking technical surfaces, in particular those of cavities in technical components, for the purpose of detecting damage to such surfaces and for determining the extent of such damage. The technoscope comprises a shaft for receiving an optical system for visual inspection of said surfaces and which is provided, at the proximal end of the shaft with a focussing eyepiece, a lighting system for illuminating a surface to be checked, and a supply passage for the insertion of auxiliary instruments or remedial devices.

BACKGROUND OF THE INVENTION

After a technical inspection of an industrial plant, a power unit or the like, supplemental visual checks must be made for surface damage which could result in restricted operation or even complete breakdown or disintegration of the items to be checked. It is common practice to make such checks by the use of technoscopes comprising television or video cameras for aimed visual inspection. It is also customery to use photographic cameras for documenting discovered damage, for example changes attributable to material fatigue. Such checking operations are important because even the smallest damage to the surface may result in total functional failure or total destruction of the part concerned.

Such checks may be made by means of the method described in DE-A-3512602 by means of which the extent of the damage is measured directly or indirectly by means of a measuring grid or the like within the eyepiece of the optical system, once a crack or a damaged area has bee found. Substances reflecting ultraviolet light, such as magnetic powder, or fluids which allow visual determination to be made of the longitudinal or areal extent of crack damage may be used in assessing hair cracks, for example.

A complete evaluation of the damage for an expert opinion, cannot however, be made unless the depth of the damage as well as the area thereof is precisely determined.

SUMMARY OF THE INVENTION

An object of the invention is, therefore, to enable the depth of the damage to be precisely determined as a complement to its detection and admeasurement.

According to the invention, this object is attained by providing a technoscope having a distal end of the shaft of which is provided with a measuring attachment which can be fastened thereto, so as to be releasable but untwistable, for determining the dept of a damaged area.

According to a preferred embodiment of the invention, the measuring attachment may comprise a measuring probe and a supporting element secured on thrust elements which are displaceable in mutually opposed directions in radial alignment, by pneumatic actuation means. The thrust elements are preferably displaced by means of a short stroke pneumatic cylinder having a piston rod for forcing the thrust elements apart from each other against the action of resilient means. The distal end of the shaft may be provided with a supporting collar for precisely locating and supporting the technoscope within a cavity the surface of which is to be checked. Evaluation of the depth measurement may be made by means of a crack depth measuring instrument operating in accordance with the d.c. potential sensor method.

BRIEF DESCRIPTION OF THE DRAWINGS

FIG. 1 is a side view an upper end of a technoscope for checking surfaces of cavities in technical components;

FIG. 1A is a transverse cross sectional view of a shaft shown in FIG. 1;

FIG. 1B is a side view with portions broken away of an end of a shaft of the technoscope of FIG. 1;

FIG. 2 is a side view of the technoscope, displaced by 90° about its longitudinal axis with respect to the side view of FIG. 1;

DETAILED DESCRIPTION OF THE INVENTION

Figure 3:
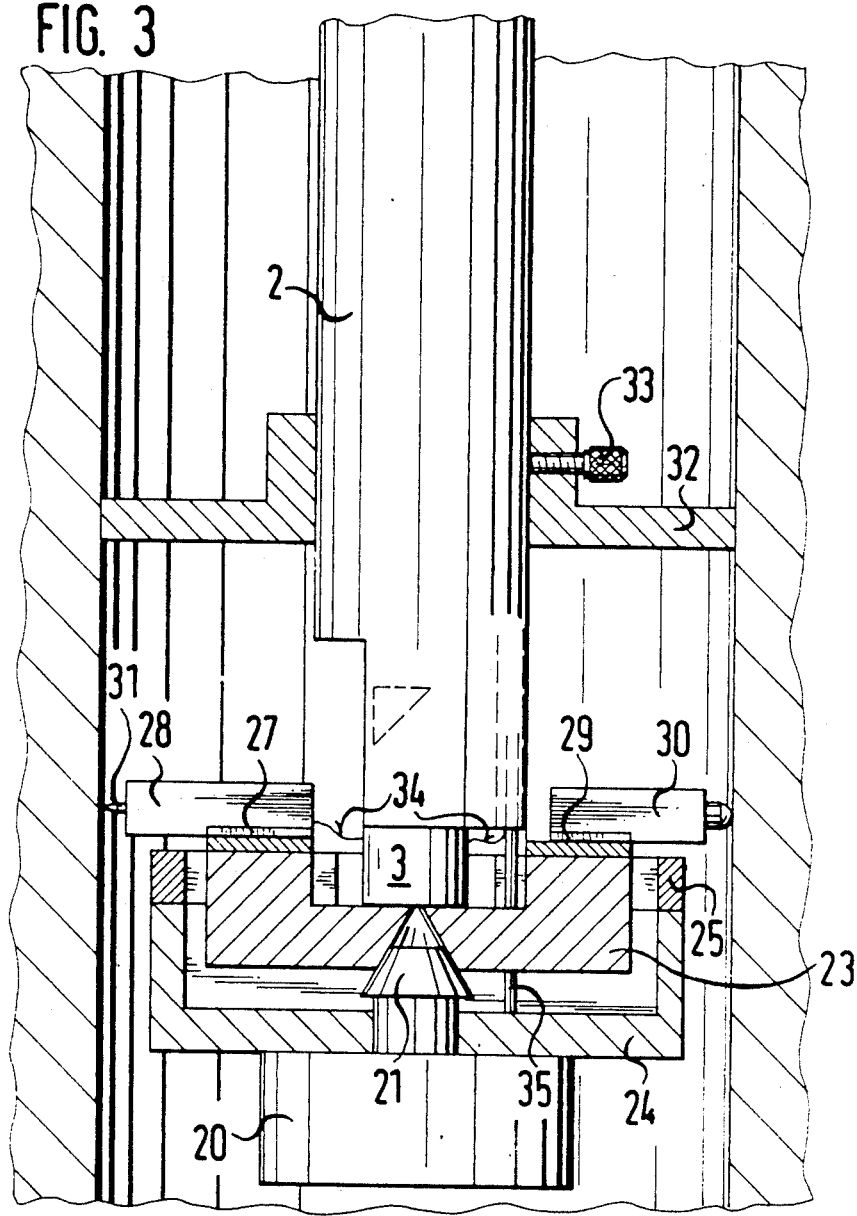
FIG. 3 is an enlarged longitudinal sectional view illustrating a measuring attachment on the technoscope, during examination of a cavity the surface of which to be checked.

As shown in FIGS. 1, 1A, 1B and 2 the technoscope, which is generally referenced 1, comprises a shaft 2 the distal end of which is lengthened by means of an extension 3 which may be of circular, oval or angular cross-section. At its proximal end, the shaft 2 is provided with a casing 4 carrying an eyepiece 5 arranged in extension of the shaft 2 and which can be focussed by means of a focussing ring 6. The eyepiece 5 is part of an optical system incorporated in the shaft 2, comprising a prism 8 for deflecting the path of a light beam from the longitudinal axis of the technoscope 1 and being protected against mechanical damage by means of a viewing aperture structure and an objective 9, as well as a plurality of relay lenses 10. There is also disposed in the shaft 2 a duct 11, for receiving a lighting system comprising either a fluid light conductor, or a bundle of light conducting fibers inserted into the duct 11. In the distal direction, said bundle of fibers 12 is followed by a prism 13 and the latter by a light egress aperture 14, to enable the interior of a cavity, the surface of which is to be examined, to be illuminated. Light for this purpose may be originated by a light projector (not shown) connected to the bundle of fibers 12 by way of a further bundle, of flexible light conducting fibers (not shown) and a light conductor stub connector 15 projecting from the casing 4. A passage 16 leading into an exit opening 17 in the area of a light egress aperture 7 is provided in the shaft 2. An auxiliary instrument, that is to say a cannula or the like, can be inserted through an introduction stub 17a on the casing 4, as indicated in FIG. 2, into the cavity to be examined, by way of the passage 16 and opening 17.

Figure 4:
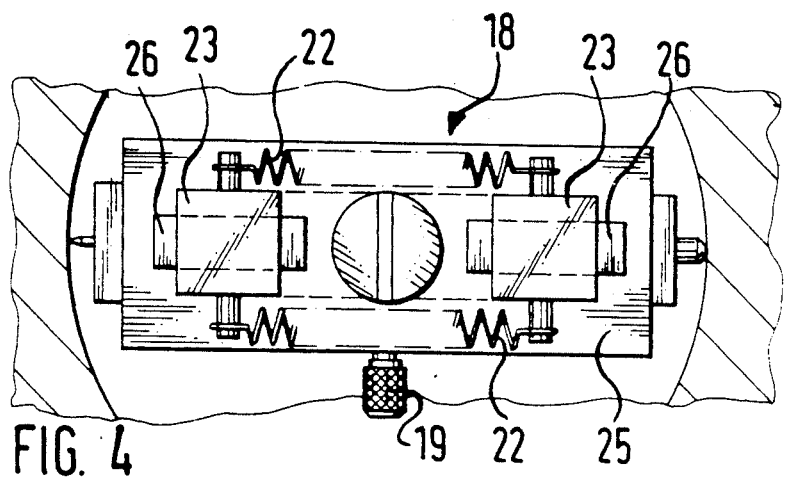
FIG. 4 is an end view of FIG. 3.

A measuring attachment 18 (FIGS. 3 and 4) can be installed on the extension 3 at the distal end of the shaft 2 are releasably and immovably fixed to the extension 3 by means of the clamping screw 19 so as to be nontwistable. Other suitable releasing fastening means (not shown) may be substitued for the screw 19.

The attachment 18 consists, in its simplest form, of a pneumatic cylinder 20 having a frusto-conical piston rod 21 acting on two thrusts elements 23 radially preloaded by means of springs 22, and which are secured so as to be longitudinally displaceable in a locating and fastening element 25 fixed immovably to a casing 24. Parts of the thrust elements 23 traverse excisions 26 in the element 25. A measuring probe 28 of a crack depth measuring instrument (not shown) is carried by a mounting 27 on the traversing part of one of the thrust elements 23, whereas the other thrust element 23 carries a supporting element 30 on a mounting 29. The measuring probe 28 is connected to the depth measuring instrument by way of a lead 34 which may extend, together with a pressure fluid pipe 35 connected to the cylinder 20, through a separate passage or along the shaft 2, the lead 34 being coupled to the depth measuring instrument, which is located outside the cavity and the pipe 35 being extended to a pressure pump. A support collar 32 can be slid over the distal end of the shaft 2 and releadably secured thereto by means of a screw 33 to locate and support the technoscope 1, in the cavity, which may be a bore, pipe, or passage, for example, the surface of which is to be visually checked.

For use of the endoscope 1, the internal diameter of said cavity is first determined, and a collar 32, adapted to said diameter is secured to the shaft 2 by means of the screw 33 so that the technoscope 1 is supported uniformly throughout its length on the internal surface of the cavity by way of the collar 32. Said surface may be subjected to a complete visual inspection by continual axial displacement of the technoscope 1 along the cavity, and rotation thereof about its longitudinal axis.

In order to determine the areal extent of superficial damage to the surface to be examined, any damaged area may be tinted by means of magnetic powder, or by means of a fluid reflecting ultraviolet light and irradiated by an ultraviolet light source; the damaged area being thereby clearly identified. Such tinting substances may be introduced directly through the passage 16, or by way of a cannula inserted therethrough, into the cavity to be examined. When the areal extent of the damage has been determined, the measuring attachment 18 is located so that the measuring probe 28 is positioned in the region of the damaged area, on the surface to be examined. The depth of the damaged area, for example the depth of a crack, is determined in accordance with the d.c. potential sensor method, by virtue of which said depth measuring instrument operates. The measuring probe 28 comprises two measuring electrodes 31 which straddle the damaged area and between which a disturbance is caused thereby in lines of current which expand in the shape of a pillow, the resultant potential difference being used as a measure of the crack depth. In order to ensure constant precise measurement of said depth, that is to say in order effectively to avoid thermal strains between said electrodes 31 and the surface of the cavity, which strains would falsify such measurement, the measuring probe 28 is urged against the surface to be examined, by the supporting element 30 which engages the opposite surface of the cavity, the thrust elements 23 being forced apart from each other by the piston rod 21 against the action of the springs 22; whereby the electrodes 31 penetrate said surface to be examined.

Since the crack depth can only be established at a single selected point at a time a plurality of individual readings are needed to measure the depth of a long crack.

What is claimed is:

1. A technoscope for checking a surface of a technical component for damage and determining the extent thereof, the technoscope comprising; a shaft having a distal end and a proximal end and lighting system for illuminating said surface; an optical system received in said shaft for visual inspection of said surface and having at the proximal end of said shaft an eyepiece provided with focussing means therefor; a measuring attachment for determining the depth of a damaged area of said surface, said measuring attachment comprising a measuring probe and a supporting element which are secured in alignment radially of said shaft on thrust elements, and pneumatically actuable means for displacing said thrust elements in mutually opposite direction; and means for releasably fixing said measuring attachment to the distal end of said shaft against rotation relative thereto.

2. A technoscope as claimed in claim 1, comprising spring means urging said thrust element towards one another, said pneumatically actuable means being in the form of a short stroke pneumatic piston and cylinder unit for forcing said thrust elements apart against the action of said spring means.

3. A technoscope as claimed in claim 1, comprising a supporting member for supporting the technoscope in a cavity presenting said surface to be checked.

4. A technoscope as claimed in claim 1, wherein said shaft has extending from its proximal end a supply passage for the insertion of auxiliary instruments.

5. A technoscope as claimed in claim 1, wherein said shaft has extending from its proximal end a supply passage for the insertion of remedial devices.

6. A technoscope for checking a surface of a technical component for damage and determining the external thereof, the technoscope comprising; a shaft having a distal end and a proximal end and a lighting system for illuminating said surface; an optical system received in said shaft for visual inspection of said surface and having at the proximal end of said shaft an eyepiece provided with focussing means therefor; a measuring attachment for determining the depth of a damaged area of said surface, said measuring attachment comprising a measuring probe connected to a crack depth measuring instrument for determining the depth of a crack in said surface in accordance with a potential difference across said crack as measured by said probe; and means for releasably fixing said measuring attachment to the distal end of said shaft against rotation relative thereto.

7. A technoscope according to claim 6, wherein said optical system at a distal end has a prism and said lighting system has a prism adajacent the distal end of the shaft.

8. A technoscope according to claim 6, wherein said shaft has a passage with an opening adjacent the distal end of the shaft.

9. A technoscope for checking a surface of a technical component for damage and determining the extent thereof, the technoscope comprising; a shaft having a distal end and a proximal end and a lighting system for illuminating said surface; an optical system received in said shaft for visual inspection of said surface and having at the proximal end of said shaft an eyepiece provided with focussing means therefor; a measuring attachment for determining the depth of a damaged area of said surface, said measuring attachment being connected to a depth measuring instrument which is operable in accordance with a d.c. potential sensor method for evaluating depth measurement; and means for releasably fixing said measuring attachment to the distal end of said shaft against rotation relative thereto.

* * * * *